United States Patent [19]
Graham et al.

[11] Patent Number: 6,000,315
[45] Date of Patent: Dec. 14, 1999

[54] LIFT CONTROL FOR IMPLEMENT FRAME

[75] Inventors: William Douglas Graham, East Moline; Ronald Lee Pratt, Taylor Ridge, both of Ill.

[73] Assignee: Deere & Company, Moline, Ill.

[21] Appl. No.: 09/072,238

[22] Filed: May 4, 1998

[51] Int. Cl.⁶ ............................. F15B 11/00; F15B 13/00
[52] U.S. Cl. .............................................. 91/520; 91/536
[58] Field of Search ............................. 91/518, 520, 528

[56] References Cited

U.S. PATENT DOCUMENTS

| | | | |
|---|---|---|---|
| 3,381,588 | 5/1968 | Londal | 91/520 |
| 3,476,016 | 11/1969 | Dixon et al. | 91/520 |
| 3,486,761 | 12/1969 | Fay | 280/43.23 |
| 3,627,053 | 12/1971 | Hook et al. | 172/9 |
| 3,663,032 | 5/1972 | Hook et al. | 280/43.23 |
| 4,164,122 | 8/1979 | Ward . | |
| 4,241,641 | 12/1980 | Reinert | 91/520 X |
| 4,423,664 | 1/1984 | Buchl | 91/520 X |
| 4,506,898 | 3/1985 | Herron | 92/520 X |
| 4,531,451 | 7/1985 | Mouton | 91/520 X |
| 4,567,727 | 2/1986 | Grams | 92/520 X |
| 4,655,031 | 4/1987 | Kucera | 91/520 X |
| 4,821,806 | 4/1989 | Winter | 91/520 X |
| 4,828,655 | 5/1989 | Buchl et al. | 60/546 |
| 4,927,165 | 5/1990 | Murray | 280/43.23 |
| 5,427,182 | 6/1995 | Winter | 172/2 |

*Primary Examiner*—John E. Ryznic

[57] ABSTRACT

Frame sections on an implement are supported above the ground by lift wheel assemblies having positive mechanical depth stops and series connected lift cylinders. A pressure responsive bypass valve is installed in series with an orifice between the ports of the series connected cylinders. The valve permits the corresponding cylinder to be retracted and positively held against the depth stop and allows bypass flow to the next cylinder in series for continued retraction of the next cylinder until it bottoms against the stop. The orifice protects the bypass valve poppet from damaging high flows and controls the rate of descent of the other frame sections onto the remaining stops. The system permits the cylinders to positively maintain the down-stopped positions of the sections without unwanted looseness typical with slotted or other lost motion types of connections. A restrictor valve may be added to limit the maximum pressure so that all the bypass valves cannot open at the same time.

25 Claims, 1 Drawing Sheet

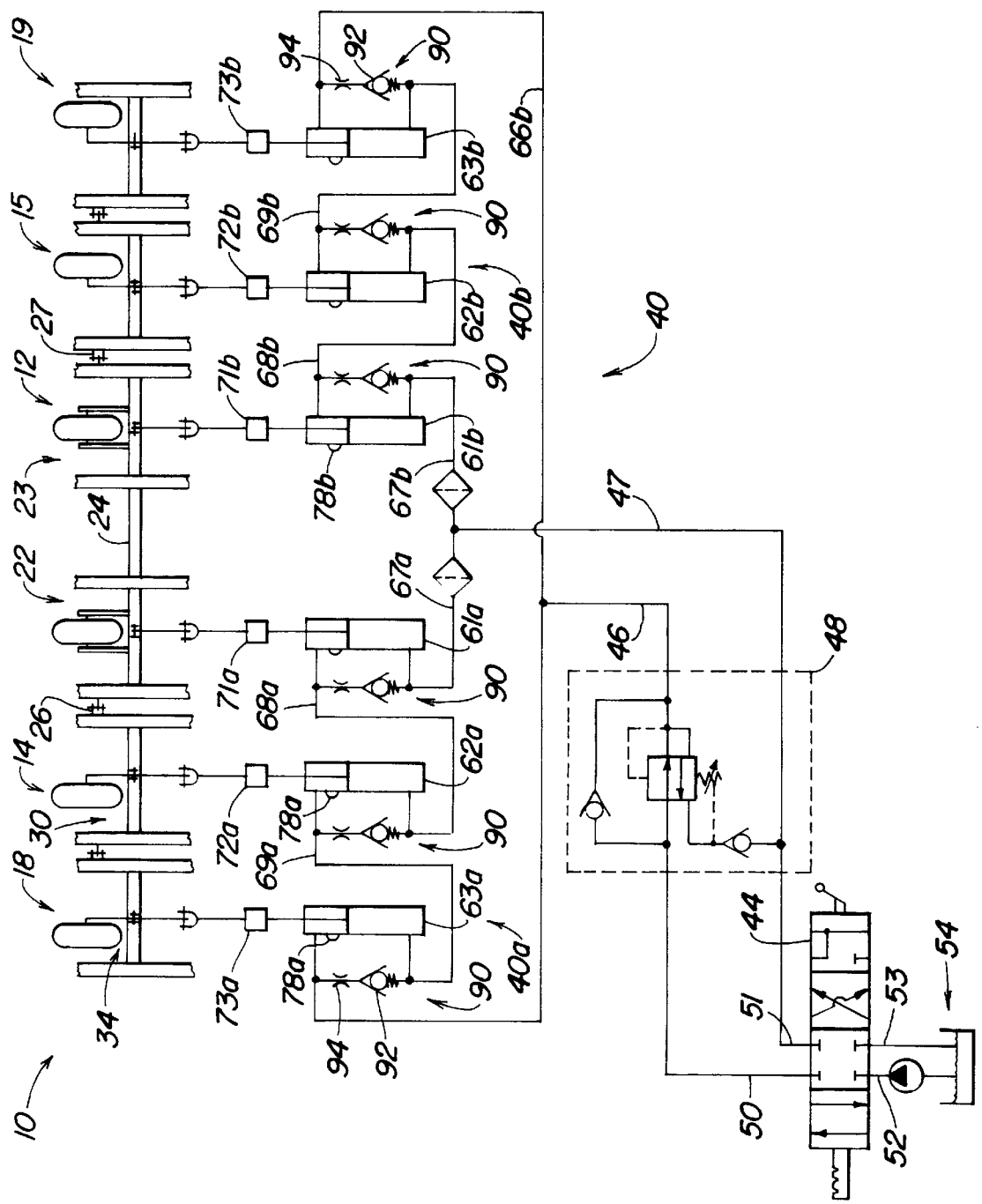

LIFT CONTROL FOR IMPLEMENT FRAME

BACKGROUND OF THE INVENTION

1) Field of the Invention

The present invention relates generally to agricultural implements, and, more specifically, to lift and depth control systems for the frames of such implements.

2) Related Art

Agricultural implements such as field cultivators, chisel plows and seeders include frames having two or more sections hinged together and moveable between a narrow folded position and a wide field-working position. Lift wheel assemblies connected to the frame sections and controlled by hydraulic cylinders raise and lower the frame sections relative to the ground to move the implement between a raised transport position and a lowered field-working position and to control tillage or planting depth in the field-working position. The hydraulic cylinder circuit controlling the lift functions typically includes a plurality of cylinders connected to a selective control valve (SCV) on the tractor. The cylinders on some circuits are connected in series with each other so that the frame sections raise and lower in unison. However, many of these circuits rely on the cylinder pressure to maintain a selected frame height during operation, and cylinder leakage or leakage elsewhere in the circuit can cause unwanted variations in the operating depth of the implement. Depth control stops can be utilized to positively set the cylinder rod position for operation of the tools on the frame sections at the desired depth, but if the cylinders are plumbed in series for level lift, the entire system will be stopped when the first cylinder hits a stop and the remaining cylinders will ride on hydraulic fluid and thus be subject to leakage. If the cylinders are plumbed in parallel, movement of the sections between transport and field-working positions is uneven unless a mechanical link such as a rockshaft is connected between wheel assemblies or a complicated valve or flow control arrangement is added to the parallel circuit. The additional links or control arrangements add complexity and cost to the system. Other systems include a slotted or lost motion connection between the cylinder and wheel assembly which eliminates stall out when the stop is reached, but such systems typically do not allow cylinder pressure to hold the wheel assembly against the stop in the operating position and, with such systems, raising the wheels into the air is difficult or impossible.

Still other depth control systems utilize series cylinders which are fully extended when the frame sections are in the transport position and fully retracted when in the frame sections are in the transport position. These types of systems rely on cylinder anchor adjustments to make changes in the frame height in the operating position. The full retraction provides a positive stop in the field-working position so drift is eliminated and allows cylinder rephasing at the end of the stoke, but the anchor adjustment may also adversely affect transport height. In addition, most cylinder anchor adjustment mechanisms are relatively large and cumbersome.

BRIEF SUMMARY OF THE INVENTION

It is therefore an object of the present invention to provide an improved depth control or frame lift system for an agricultural implement which overcomes most or all of the aforementioned problems. It is a further object to provide such a system which advantageously utilizes cylinders plumbed in series for level lift.

It is a further object of the present invention to provide an improved depth control or frame lift system for an agricultural implement having cylinders connected in series and positive depth control stops so frame height is not affected by cylinder leakage during field-working operations. It is another object to provide such a system wherein very high cylinder pressures acting against lift linkages and frame portions are avoided. It is yet another object to provide such a system wherein the cylinder pressure positively holds the lift assembly against the stop position.

It is still another object of the present invention to provide an improved depth control or frame lift system for an implement including series cylinders wherein positive depth stops are provided so that depth control in the field-working position in not affected by cylinder leakage. It is another object to provide such a system which is relatively inexpensive and wherein level lift function is provided independent of mechanical linkages or complicated hydraulic controls.

It is a further object to provide an improved depth control or frame lift system for an implement including series cylinders and positive downstops wherein cylinder retraction forces which are transferred to the implement frame and linkages are limited.

In accordance with the above objects, frame sections on an implement are supported above the ground by lift wheel assemblies having positive mechanical depth stops and series connected lift cylinders. A pressure responsive valve, preferably a poppet design, is installed in series with an orifice between the ports of the series connected cylinders. The valve permits the cylinder to be retracted and positively held against the depth stop while allowing flow to the next cylinder in series for continued retraction of the next cylinder until it bottoms against the stop. The orifice protects the bypass valve poppet from damaging high flows and controls the rate of descent of the other frame sections onto the remaining stops. Once a section bottoms on a stop, the hydraulic fluid flow changes from a high flow, low pressure condition to a low flow, high pressure condition, and the implement frame sections change from generally a free-fall condition to a hydraulically powered-down condition to draw the cylinders tight against the stops. The system permits the cylinders to positively maintain the down-stopped positions of the sections without unwanted looseness typical with slotted or other lost motion types of connections. Series cylinder circuit pressure is limited to a preselected level substantially below the output pressure available on the tractor. The preselected level is high enough to assure that the pressure responsive valves operate as necessary for full retraction of all cylinders but is low enough to assure that flow cannot occur across all the bypass valves in the series circuit, a condition which results in the cylinder rod ends moving off the stops when flow is stopped.

These and other objects, features and advantages of the present invention will become apparent to one skilled in the art upon reading the following detailed description in view of the drawings.

BRIEF DESCRIPTION OF THE DRAWINGS

FIG. 1 is a schematic representation of a hydraulic lift system with series connected cylinders and positive stops.

DETAILED DESCRIPTION OF THE DRAWINGS

Referring now to FIG. 1, therein is shown a portion of an implement 10 having a main or center frame 12, left and right inner wing sections 14 and 15, and left and right outer wing sections 18 and 19 pivotally connected for movement between an unfolded field-working position (shown) and a folded transport position. The center frame 12 is supported by a pair of lift wheel assemblies 22 and 23 connected by a rockshaft 24 for movement vertically to raise and lower the frame between transport and field-working positions, and to adjust working depth of tools when the frame is in the field-working position. The inner wing sections 14 and 15 are connected to the center frame 12 at locations 26 and 27 for pivoting about fore-and-aft extending axes. The inner wing sections 14 and 15 are generally mirror images of each other, and each section includes a lift wheel assembly 30 for adjustably supporting the section above the ground. Likewise, the outer wing sections 18 and 19 include similar lift wheel assemblies 34. The rockshaft 24 constrains the lift wheel assemblies 22 and 23 for operation in unison so the center frame 12 raises and lowers in generally a level condition.

The lift wheel assemblies are controlled by a hydraulic circuit 40 having first and second series connected cylinder circuits 40a and 40b. The circuits 40a and 40b are connected in parallel with each other and to a tractor selective control valve (SCV) 44 via lines 46 and 47, an optional pressure reducing valve or pressure restrictor 48, and SCV output lines 50 and 51. The SCV 44 has (as viewed from left to right) lower, stop, raise, and float positions. Pressure and return lines 52 and 53 connect the input ports of the SCV 44 to a source 54 of hydraulic fluid under pressure on the tractor.

The circuit 40a includes a left main frame cylinder 61a, a left inner wing cylinder 62a, and a left outer wing cylinder 63a connected in series with each other and to the lines 46 and 47 by conduit structure or lines 66a and 67a. The base end of the cylinder 61a is connected to the line 67a. The rod end of the cylinder 61a is connected by a line 68a to the base end of the cylinder 62a. The rod end of the cylinder 62a is connected to the base end of the cylinder 63a by a line 69a. The cylinders 61a–63a include adjustable positive mechanical stops 71a, 72a and 73a to limit retraction of the cylinder rods to preselected positions dependent on the desired frame section height.

As the cylinder rods are retracted, the corresponding frame sections will lower until the stops are reached. Although the stops 71a–73a are shown as gauge plates or "donuts" mounted on the cylinder rods, other stop structures and other locations, such as on the lift assemblies linkages, could also be utilized to set the height of the frame sections and stop cylinder rod movement. Each of the cylinders is double acting and includes a rephasing port 78 permitting the cylinder rod to fully extend when the base ends of the cylinders are pressurized and the frame sections are raised to their maximum height positions. The ports 78 also allow air to be purged from the hydraulic system.

The second circuit 40b is generally identical to the first circuit 40a and so will not be described in full detail. Components in the second circuit 40b are labeled with the same number as corresponding components in the first circuit 40a and include the suffix b. To synchronize operation of the left and right side sections, the main frame cylinders 61a and 61b have identical stokes and rod and base end volumes and are constrained for operation in unison by the rockshaft 24.

Bypass structure 90 is connected between the base end and rod end ports of each of the cylinders 71a–73a and 71b–73b. The structure 90 includes a pressure responsive valve 92, preferably a poppet design having a preselected cracking or set point pressure, installed in series with an orifice 94 between the ports of the series connected cylinders. The valve 92 permits the cylinder to be retracted and positively held against the corresponding depth stop while allowing flow to the next cylinder in series for continued retraction of the next cylinder until it bottoms against the stop. The orifice 94 protects the poppet of the valve 92 from damaging high flows and controls the rate of descent of the other frame sections onto the remaining stops. The pressure reducing valve 48 is an optional device added to allow use of a lower bypass valve cracking pressure and thus limit the load on the mechanical stops. Cracking pressure set points for the valves 92 can be selected to eliminate need for the valve 48 and still maintain compatibility with current tractor designs provided the mechanical depth stops can withstand the loads imposed by the higher bypass pressures.

In operation, assuming the frame sections 12, 14 and 15, and 18 and 19 in the maximum raised positions (the cylinders 71a–73a and 71b–73b fully extended), the operator moves the SCV 44 to the detented lower position so the lines 67a, 67b, 47 and 51 are returned to reservoir. The sections lower in generally a free fall condition. Once the first section bottoms on a stop, the hydraulic fluid flow changes from a high flow, low pressure condition to a low flow, high pressure condition. The pressure at the valve 92 for the first cylinder to be stopped raises to a level above the set point pressure of the valve 92 causing the valve to open and allow hydraulic fluid flow to bypass the stopped cylinder through the structure 90. The implement frame sections then must be hydraulically powered-down (the SCV 44 is in the lower position) to draw the cylinders tight against the stops. Once all the sections have been lowered against their respective stops, the operator then may position the SCV in the stop or neutral position to trap some pressure in the lines and positively maintain the sections against the downstops.

The pressure reducing valve 48 limits series cylinder circuit pressure to a level substantially below the output pressure available from the tractor at the line 52. The release pressure of the valves 92 is substantially below the set point pressure of the valve 48. The maximum pressure to the series cylinders preferably is kept below the product of the number (n) of valves 92 in the series circuit times the set point pressure (P) of the valves 92, i.e., [n×P]. For example, if the set point pressure P of each of three valves in an 3-cylinder hydraulic circuit is 600 psi, the maximum pressure is kept below 1800 psi. The pressure available is limited so that flow cannot occur across all the bypass valves in the series circuit at the same time. The minimum pressure in the system to assure that the valves 92 will open should be greater than 1200 psi, i.e., [(n−1)×P], for the system wherein n=3 and P=600 to assure that the third or last to bottom out cylinder can retract fully.

To lift the frame sections towards a raised transport position, the SCV 44 is moved to the raise position to pressurize the lines 51, 47 and 67a and 67b and extend the cylinders generally in unison for level implement lift. Preferably the rod end volume of a cylinder is matched to the base end volume of the next cylinder in series so that rod extensions are uniform. If a given cylinder reaches its fully extended position before other cylinders, the bypass valve 92 for that cylinder opens and permits the remaining cylinders to continue to extend to their stopped positions.

Having described the preferred embodiment, it will become apparent that various modifications can be made without departing from the scope of the invention as defined in the accompanying claims.

We claim:

1. A lift system for an implement towed over the ground by a vehicle having a source of hydraulic fluid under pressure, the implement including first and second frame sections, the lift system comprising:

first and second lift wheel assemblies connected to first and second respective frame sections including first and second extendable and retractable lift cylinders, the cylinders having rod end ports and base end ports;

conduit structure connecting the first and second cylinders for operation in series;

a control valve connected to the conduit structure and to the source of hydraulic fluid on the vehicle and selectively controlling extension and retraction of the cylinders assemblies for moving the frame sections generally in unison relative to the ground;

first stop structure connected to the first lift wheel assembly and preventing further movement of the first cylinder beyond a preselected position; and a bypass valve connected between the rod end port and the base end port of the first cylinder and permitting continued movement of the second cylinder after the first cylinder reaches the preselected position.

2. The lift system of claim 1 wherein the bypass valve comprises a check valve.

3. The lift system of claim 2 further comprising a flow restrictor connected in series with the bypass valve to control fluid flow to the second cylinder after the first cylinder reaches the preselected position.

4. The lift system as set forth in claim 1 further comprising a pressure reducing structure connected between the source and the first and second cylinders and limiting pressure in the conduit structure to a preselected maximum pressure.

5. The lift system as set forth in claim 4 wherein the bypass valve comprises a valve having a relief pressure threshold P, wherein P is substantially less than the preselected maximum pressure.

6. The lift system as set forth in claim 5 including n cylinders connected in series and n bypass valves, and wherein the preselected maximum pressure to the cylinders is greater than (n−1)×P and less than (n×P).

7. The lift system as set forth in claim 1 wherein the cylinders retract in generally a free-fall low pressure, high volume condition until the first cylinder reaches the preselected position.

8. The lift system as set forth In claim 7 wherein the bypass valve has a release pressure wherein bypass flow around the first cylinder is provided, and the pressure at the conduit structure increases above the release pressure when the first cylinder reaches the preselected position, and further comprising an orifice connected in series with the bypass valve to protect the bypass valve and control the flow of fluid to the second cylinder thereby controlling rate of movement of the second section after the first cylinder reaches the preselected position.

9. The lift system as set forth in claim 8 further comprising a pressure restrictor connected between the control valve and the cylinders for limiting pressure in the conduit structure.

10. A lift system for an implement towed over the ground by a vehicle having a source of hydraulic fluid under pressure, the implement including vertically movable first and second frame sections, the lift system comprising:

a plurality of lift assemblies connected to the frame sections including at least first and second lift cylinders for raising and lowering the first and second frame sections, respectively;

means connecting the lift cylinders to the source for operation in series including a control valve selectively controlling operation of the cylinders for moving the frame sections generally in unison relative to the ground;

stop means operable during lowering of the first frame section for preventing further operation of the first cylinder when the first frame section reaches a preselected stop position relative to the ground; and means for bypassing the first cylinder when its operation is prevented and facilitating further operation of the second cylinder after the first frame section reaches the preselected stop position.

11. The lift system as set forth in claim 10 wherein the means for bypassing includes a bypass valve connected in series with a restrictor limiting fluid flow through the bypass valve to the second cylinder when operation of the first cylinder is prevented.

12. The lift system as set forth in claim 10 wherein the fluid pressure to the first cylinder increases when the first frame section reaches the preselected stop position and the means for bypassing the first cylinder includes a valve responsive to the fluid pressure increase.

13. The lift system as set forth in claim 12 wherein the valve comprises a pressure responsive poppet.

14. The lift system as set forth in claim 13 wherein the first cylinder includes rod end and base end ports, and the pressure responsive poppet is connected between the ports.

15. The lift system as set forth in claim 14 further comprising a flow restrictor connected in series with the poppet between the ports.

16. The lift system as set forth in claim 13 further comprising a pressure restrictor connected between the control valve and the cylinders and limiting pressure to the cylinders to a preselected maximum, and wherein the pressure responsive check poppet has an open flow condition at a pressure below the preselected maximum.

17. The lift system as set forth in claim 10 wherein the control valve facilitates operation of the cylinders in a low pressure, high flow condition for lowering the frame sections at a first rate, and, after the first frame section reaches the preselected stop position, operation of the cylinders at a high pressure, low flow condition for lowering the frame sections at a rate less than the first rate.

18. The lift system as set forth in claim 17 wherein the means for bypassing the first cylinder includes a pressure responsive valve.

19. The lift system as set forth in claim 18 further including a restrictor connected to the pressure responsive valve limiting fluid flow to the second cylinder.

20. The lift system as set forth in claim 10 including n cylinders connected in series, each cylinder including a bypass valve associated therewith having a set point pressure P whereat the valve opens to allow bypass flow around the associated cylinder, and means for limiting pressure to the cylinders within a range of greater than (n−1)×P and less than (n×P).

21. A hydraulic system including at least first and second extendible and retractable actuators, each of the actuators including piston structure defining first and second chambers on opposite sides of the piston structure, the first chamber of the first actuator connected to a source of actuator fluid under pressure, and the second chamber of the first actuator connected to the first chamber of the second actuator for operation of the actuators in series, and a pressure responsive bypass valve connected between the first chambers of the first and second actuators and providing fluid flow from the source to the second actuator when the pressure in the first chamber of the first actuator exceeds a preselected pressure.

22. The hydraulic system as set forth in claim 21 including a mechanical stop connected to the first actuator limiting movement of the first actuator, wherein the pressure at the bypass valve increases to operate the bypass valve when the movement of the first actuator is limited.

23. The hydraulic system as set forth in claim 22 wherein the mechanical stop is adjustable and limits the retraction of the first actuator.

24. The hydraulic system as set forth in claim 21 including first and second lift assemblies connected to an implement frame and to the first and second actuators, the first and second actuators providing generally level vertical movement of the implement frame when the actuators operate in series.

25. The hydraulic system as set forth in claim 21 including a flow restrictor connected in series with the bypass valve.

* * * * *